Figure 1:
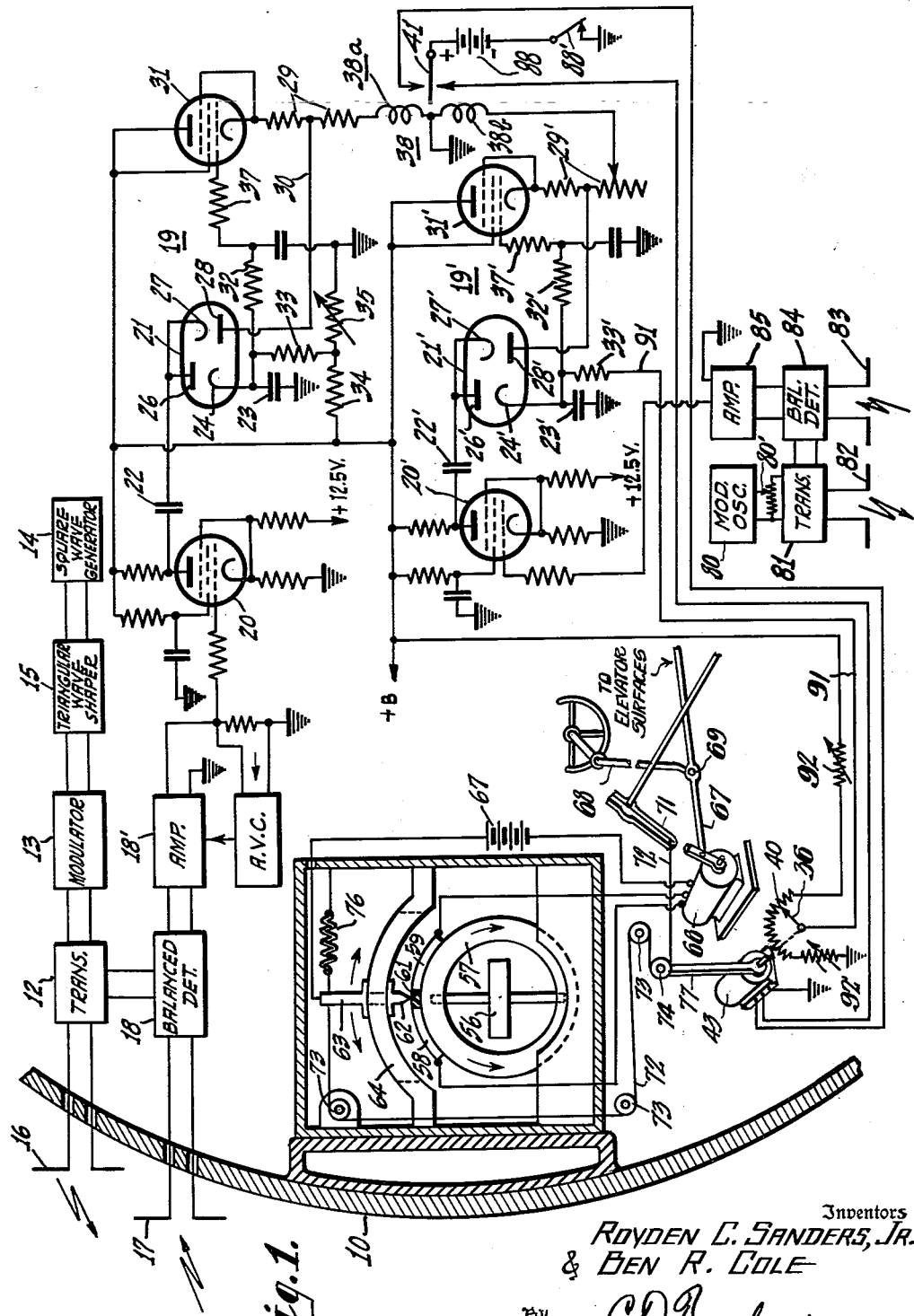

Oct. 24, 1961    R. C. SANDERS, JR., ET AL    3,005,981
RADAR CONTROL SYSTEM FOR GLIDE PATH CONTROL OF AIRCRAFT
Filed May 19, 1944    2 Sheets-Sheet 1

Inventors
ROYDEN C. SANDERS, JR.
& BEN R. COLE
By C.D. Puska
Attorney

Oct. 24, 1961    R. C. SANDERS, JR., ET AL    3,005,981
RADAR CONTROL SYSTEM FOR GLIDE PATH CONTROL OF AIRCRAFT
Filed May 19, 1944    2 Sheets-Sheet 2
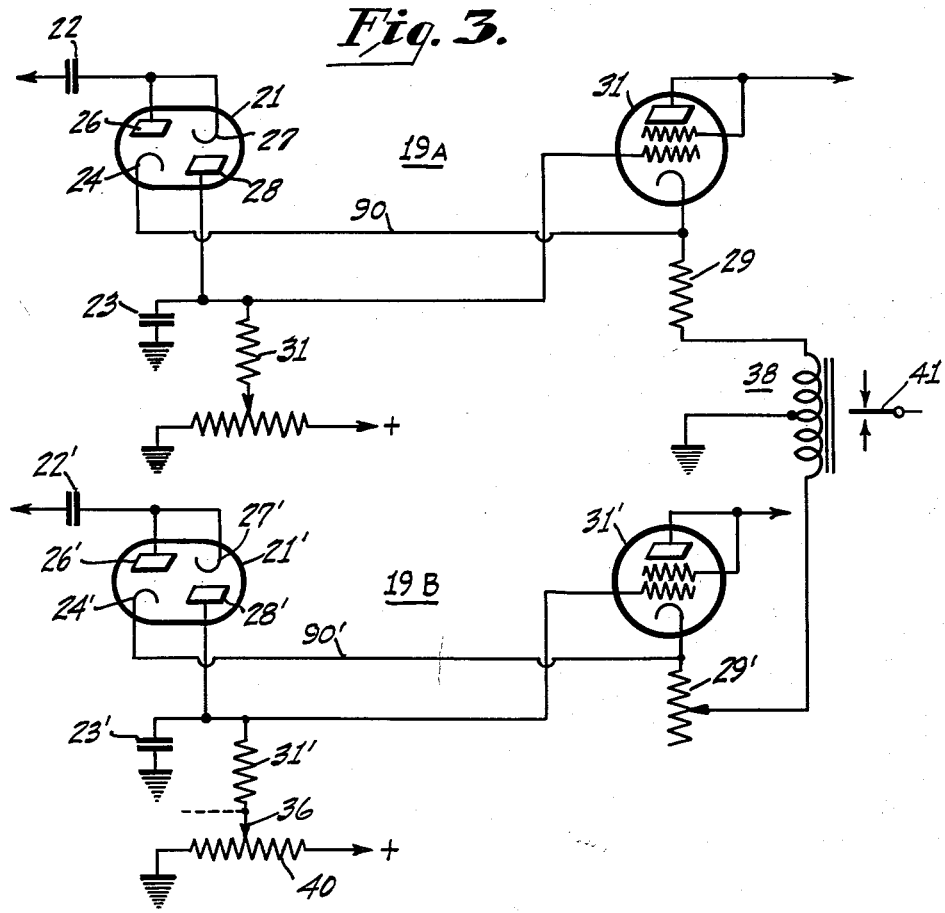
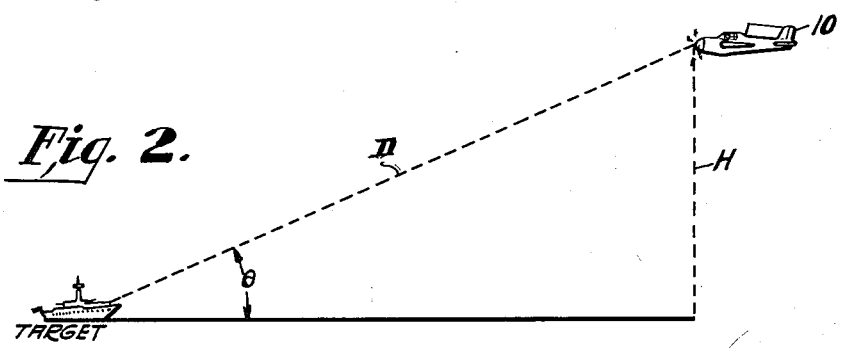
Inventors
ROYDEN C. SANDERS, JR.
& BEN R. COLE
By C.D. Tuska
Attorney

3,005,981
RADAR CONTROL SYSTEM FOR GLIDE PATH CONTROL OF AIRCRAFT

Royden C. Sanders, Jr., Hightstown, and Ben R. Cole, Princeton, N.J., assignors to Radio Corporation of America, a corporation of Delaware
Filed May 19, 1944, Ser. No. 536,382
3 Claims. (Cl. 343—14)

Our invention relates to the automatic control of an object in flight and particularly to the use of a reflected radio signal for directing a dirigible air-borne device such as an aircraft or aerial torpedo along a predetermined downward path towards an enemy ship or other target.

One object is to provide an improved means for and method of flying a bomb loaded aircraft or an aerial torpedo into a target.

Another object of the invention is to provide an improved method of and means for automatically directing an object in flight along a predetermined downward path towards a signal reflecting object.

According to one embodiment of the invention the aircraft or flying torpedo is made to fly toward a target with a constant angle of approach. This may be accomplished by providing the aircraft with a radio altimeter for determining its altitude and with a radio distance determining system for determining its slant distance to the target and by providing a control circuit for decreasing the altitude of the aircraft in response to a decrease in the slant distance to the target. This control circuit may comprise a reversible motor controlled by a differential relay that is operated by the outputs of the slant distance determining circuit and the altimeter circuit. The reversible motor is mechanically coupled through reduction gears to a movable tap on a voltage divider. The voltage divider tap and the reversible motor comprise a follow-up circuit for the altimeter control system which preferably is of the type including a gyrostabilizer. Such an altimeter and gyrostabilizer system is described and claimed in a copending application Serial No. 484,458, filed April 24, 1943 by Royden C. Sanders, Jr. and John H. Purl, now Patent No. 2,443,748, issued June 22, 1948, and entitled Aircraft Control System. As the aircraft approaches a target, the follow-up motor is energized and it causes the aircraft to go to a lower altitude. Simultaneously the follow-up circuit brings the two energizing currents in the differential relay coils to equal values and thus stops the rotation of the follow-up motor.

The left-right control system for making the aircraft or torpedo fly toward the target may be of the type wherein left-right directive antennas having overlapping radiation patterns are switched for radiating a frequency-modulated radio signal successively therefrom. Such a system is described and claimed in copending application Serial No. 527,292, filed March 20, 1944, now Patent No. 2,459,457 issued January 18, 1949, in the name of Royden C. Sanders, Jr., and entitled Comparator Circuits for Radio Locators.

The invention will be better understood from the following description taken in connection with the accompanying drawing in which FIGURE 1 is a circuit and block diagram of one embodiment of the invention as applied to an aircraft or torpedo, FIGURE 2 is a diagram that is referred to in explaining the invention, and FIGURE 3 is a circuit diagram of a frequency counter circuit that may be substituted for the counter circuit shown in the system of FIG. 1.

In the several figures, similar parts are indicated by similar reference characters.

FIG. 1 shows the invention applied to an air-borne device such as an airplane, a drone, or a glider, which is controllable in flight. The nose of the fuselage of the air-borne device is indicated at 10. The invention will be described as applied to a drone (i.e., an aircraft operated by remote radio control) or flying torpedo that is to be flown with a bomb load into an enemy ship. Thus, as shown in FIG. 2, the aircraft 10 is flown automatically along a path D into the target. The path D may always be at a fixed angle $\theta$ to the earth's surface as indicated in FIG. 2, or the angle $\theta$ may be made to change as the aircraft approaches the target. In any case, according to the present invention, the elevation control of the aircraft is responsive to means for comparing the slant distance from aircraft to target (the distance along path D) and the altitude H of the aircraft whereby the altitude H is reduced as the target is approached or $H = k_1 D + k_2$ where $k_1$ and $k_2$ are constants.

The apparatus for measuring the slant distance from the aircraft to the target and the apparatus for measuring altitude (the altimeter) are similar as will appear hereinafter. The slant distance measuring apparatus will first be described with reference to FIG. 1. It comprises a frequency-modulated radio transmitter unit that includes a radio transmitter 12, a frequency-modulating unit 13, a square wave generator 14 which supplies a square wave to a wave shaping circuit 15 for producing a triangular wave whereby a linear frequency modulation of the transmitted radio wave is obtained. The radio wave is radiated forwardly towards the target from a directional antenna 16 which may be of the Yagi type.

The frequency-modulated signal reflected from the target is received by a similar directive antenna 17 and supplied to a detector 18 where it heterodynes with frequency-modulated signal supplied directly from the transmitter 12 to produce a beat signal at audio frequency. Since the beat signal frequency depends upon the radio propagation time to the target, it is a measure of the slant distance. The beat signal is passed through an amplifier 18' to an amplitude limiter 20 and the resulting square wave signal is applied to a frequency counter 19.

The counter 19 comprises a pair of oppositely connected diodes in a common envelope 21 to which the square wave from the limiter 20 is applied through a capacitor 22 of comparatively small capacity. A storage capacitor 23 of comparatively large capacity has a charge supplied to it through the cathode 24 and anode 26 of one diode upon the occurrence of each positive half cycle of the square wave. Since the capacitor 22 is small enough to reach full charge during the first part of a square wave half cycle, the storage capacitor 23 is charged up a fixed additional amount each time a positive half cycle occurs whereby the voltage thereacross is proportional to the beat frequency, and, therefore, to distance. This voltage is applied to the grid of a vacuum tube 31 through a filter resistor 32 and a tube protective resistor 37.

The diode which comprises a cathode 27 and an anode 28 is provided to discharge the capacitor 22 at the end of each positive half cycle to prevent it from blocking. The anode 28 is connected through a lead 30 to an intermediate point on a cathode resistor 29 of the vacuum tube 31 (rather than directly to the cathode of tube 31) to prevent current flow through the diode 27, 28 due to contact potential.

The storage capacitor 23 is provided with a leakage path through a resistor 33 and the variable resistor 35 of a voltage divider 34, 35 whereby it may reach an equilibrium voltage for a given applied beat frequency. The equilibrium point may be set for the desired beat frequency representing a certain slant distance and determining the terminal altitude by adjusting the value of resistor 35.

The distance indicating voltage, which is applied from capacitor 23 to the control grid of the amplifier tube 31, controls the amount of direct current flowing through the coil 38a of a differential relay 38 in the cathode circuit of the tube 31. The relay 38 also has a coil 38b through which there is an opposing current flow that is a function of the altitude. A constant ratio of altitude to slant distance is maintained as a result of the relay 38 operating to maintain a constant ratio of current in the coil 38a to current in the coil 38b. To accomplish this, the position of the relay armature 41 is made to control the direction of rotation of a reversible motor 43 which includes a reduction gear unit. When the motor 43 rotates, it moves a tap 36 along a resistor 40 in the altitude control system. As will be explained below, the motor 43 will rotate until the "altitude" current in the relay coil 38b equals the "distance" current in the relay coil 38a at which time the armature 41 is brought to its neutral position. In one example of the invention where the automatic pilot gyroscope (described below) is adjusted for level flight, as the aircraft 10 approaches the target, the motor 43 will be operated by the relay 38 to change the altitude limit control of the aircraft 10 (i.e., to change the position of the tap 36) to reduce its altitude as explained hereinafter.

The altitude control apparatus and the way in which it is controlled in accordance with the slant distance will now be described with reference to FIG. 1.

Referring to FIG. 1, an automatic pilot mechanism of known construction is provided, connected to the elevator control surfaces of an airplane. The automatic pilot includes a longitudinal attitude control gyroscope 56 provided with a gimbal ring 57, carrying two conducting sectors 58 and 59 separated by a small insulating sector 61. A contact 62, engaging either the sector 61 or one of the conducting sectors 58 and 59, is on the end of a lever 63 that is slidably supported in an arcuate slot in a supporting member 64 so that the contact 62 will be guided in an arcuate path about the sectors 58, 59 and 61. The sectors 58 and 59 are connected to two terminals of a reversible motor 66 while the contact 62 is connected through the lever 63 and through a direct-current source 67 to a third terminal of the motor 66. The shaft of the motor 66 is mechanically coupled through a linkage 67 to the elevator surfaces (not shown) of the airplane.

The control stick 68 of the airplane is connected at a pivot 69 to the control linkage, and through an arm 71 to a cable 72. The cable 72 is guided over a plurality of pulleys 73 and a pulley 74 and connected to the lever 63 carrying the contact 62. A spring 76 is provided to maintain the cable 72 under tension. The pulley 74 is supported at the end of a lever 77 secured to the shaft of the reversible motor 43.

Neglecting temporarily the effect of operating the motor 43, the operation of the system thus far described is as follows: The gyroscope 56 tends to maintain a constant attitude, with its rotor in a plane parallel to the surface of the earth. The movable contact 62 normally engages the insulating sector 61. Any deviation of the airplane from level flight will move the contact 62 with respect to the ring 57, and into contact with sectors 58 and 59. Thus the motor 66 will be energized so as to run in the proper direction to adjust the elevator control surfaces to cause the airplane to resume its attitude for level flight. In moving to adjust the control surface, the motor 66 also moves the cable 71, rotating the contact 62 with respect to the longitudinal axis of the craft. When the contact 62 reaches the insulated sector 61, the motor is deenergized. During this time the control surfaces have been bringing the aircraft back toward the position of level flight. As the airplane continues toward its normal attitude, the contact 62, which has been displaced ahead of the gyroscope, passes the insulated sector and engages the opposite conducting sector, causing the motor 66 to run in the reverse direction. This returns the control surfaces toward the position for a level flight. Thus the applied control is removed as the airplane is returning to its normal attitude, so that the control surface will be back in its neutral or central position when the disturbance has been corrected. Briefly, a follow-up action has been applied to control the aircraft's attitude as a function of the gyro control.

In order to maintain flight along a descending path, a radio altimeter similar to the slant distance measuring system may be used to actuate the automatic pilot.

The altimeter comprises a frequency-modulated transmitter 81 that radiates the signal downwardly from an antenna 82. The transmitter may be frequency-modulated by a modulating oscillator 80 which preferably supplies a triangular wave signal, for example. The band width of the frequency-modulation sweep may be adjusted by means of a variable tap 80'. This adjustment may be employed to control the angle of dive of the aircraft. The reflected signal is received by an antenna 83 and supplied to a detector 84 where it beats with the frequency-modulated signal supplied directly from the transmitter 81 to produce an audio signal having a beat frequency that corresponds to the altitude H (FIG. 2) of the aircraft 10.

The beat frequency signal is supplied through an amplifier 85 and an amplitude limiter tube 20' to a frequency counter 19' which is of the same type as the counter 19 previously described. The parts in counter 19' corresponding to those in the counter 19 are indicated by the same reference numerals with a prime mark added. The coil 38b of the differential relay 38 is connected in the cathode circuit of the tube 31'. Thus, the relay armature 41 connects a D.-C. source 88 to the motor 43 with the correct polarity for either forward or reverse operation, depending upon whether the output of the counter 19 or that of the counter 19' is the greater. The D.-C. operating voltage for the limiter and counter tubes is taken from a common source to avoid any unbalance due to changes in the operating voltage amplitude.

Bias for follow-up control is applied to the counter 19' through the resistor 33' which is connected through a conductor 91 to the follow-up tap 36. Thus the voltage on resistor 40 at the tap 36 determines the output of the counter 19' for a given altitude with a given circuit adjustment.

In operation, the magnitude of the output of the counter 19' decreases with a decrease in frequency, and hence with a decrease in altitude. In adjusting the circuit, the counter bias voltage taken off the follow-up tap 36 is given a value such that a desired predetermined current flows through the relay coil 38b at a selected altitude. The bias voltage may be adjusted by adjusting the current through the resistor 40 by means of a variable resistor 92. The relay armature 41 is moved to its upper or lower position depending on whether the output of counter 19' is less or greater than the output of counter 19, thus energizing the motor 43 to move the pulley 74, displacing the contact 62 from the level flight position and causing the attitude of the airplane to change in the direction for either increasing or decreasing descent.

At the same time, the motor 43 also moves the follow-up tap 36 along the resistor 40, thus changing the counter bias voltage applied through resistor 33' to the counter 19' in the direction to bring the relay armature 41 back to its neutral or center position. The lever 77 and the follow-up tap 36 are normally centered for level flight in the method of operation being described. Assume that as the airplane moves toward the target, its rate of descent is too gradual so that its flight path is above the desired path D. Since the ratio of altitude to slant distance is too high, the current in the relay coil 38a is less than that in the relay coil 38b and the relay 38 is actuated to start the motor 43 and thus change the position of the pulley 74. This moves the contact 62 with respect to the gimbal ring 57, operating the motor 66 to change the flight attitude so as to bring the airplane to the path D. Motion of the motor 43 also moves the follow-up tap 36, changing the counter bias voltage in the sense to make the current in the relay coil 38b decrease and disconnect battery 88 from the motor 43. As the airplane approaches the desired path D, the relay 38 is operated to reverse the motor 43, returning the follow-up tap 36 and the contact 62 to their normal positions for the path D. In the example just described, mechanical control ratios between the motor 43, the pulley 74 and the follow-up tap 36 are such that the contact 62 is centered when the craft is in level flight.

It may be noted that the angle of dive $\theta$ and the terminal altitude (i.e., the altitude of the glide path over the target) may also be adjusted by the resistors 92 and 92', respectively.

Instead of adjusting the system so that the automatic pilot gyroscope 56 tends to hold the aircraft in level flight in the absence of the differential relay control, it may be preferred to adjust or bias the gyroscope so that the automatic pilot itself holds the aircraft approximately on the glide path D. In this method of operation, the radio control of the altitude to slant distance ratio has greater operating range in holding the aircraft exactly on the path D; it now has only to correct for the amount that the gyroscope 56 fails to hold the aircraft on the desired glide path. The following procedure may be practiced when this method of operation is employed:

The aircraft is flown to the desired altitude and started toward the target in level flight with the gyroscope 56 adjusted for level flight. As soon as it is desired that the aircraft shall start on the glide path D, the bias of the gyroscope 56 is changed by remote control to the glide path adjustment and, at the same time, the radio differential relay control is switched in as by closing a switch 88' in the power supply circuit for the motor 43.

The foregoing remarks with reference to remote control are made on the assumption that the aircraft does not carry a pilot. This would usually be the case where the aircraft is to be crashed into the target. However, the aircraft may carry a pilot in some cases as where the aircraft is to pass over the target at a predetermined low altitude or where the system is employed for a blind landing. Also, even in the case where the aircraft is to crash into the target, the aircraft may carry a pilot who makes the required adjustments at the start of the flight along the glide path and then bails out.

It will be understood that when the aircraft controls are switched over to the differential relay glide-path control, the aircraft will immediately seek the glide path D and will either climb or descend to reach this path unless it happens to be on the path D at the time.

If the aircraft is a drone that is to be crashed into the target, it may be feasible to start the drone on approximately its glide path D by the drone remote control, then lock the remote controls of the drone in position to hold the drone approximately on path D, and next switch in the differential relay control system by closing the switch 88'.

FIG. 3 shows the use of "negative" counter circuits 19A and 19B in place of the "positive" counters 19 and 19' shown in FIG. 1. This may be advantageous since the "negative" counters have a more linear frequency response due to the fact that the cathode 24 of the diode that unblocks the capacitor 22 may be connected through a lead 90 directly to the cathode of the cathode follower tube 31. In the "positive" counter circuit of FIG. 1, as previously stated, it is the anode 28 of the unblocking diode (here the diode 27, 28) that is connected to the cathode circuit of the tube 31, and its connection must be tapped down from the cathode to prevent diode current due to contact potential.

We claim as our invention:

1. A control system installed in a dirigible air-borne device for guiding it downwardly toward a target, said system comprising distance measuring means for producing an electrical quantity that is a predetermined function of the distance to said target, altitude measuring means for producing a second electrical quantity that is a predetermined function of the altitude of said air-borne device, a reversible motor, differential relay means for causing said motor to run in one direction or the other depending upon which one of said electrical quantities is the greater, means responsive to the rotation of said motor for changing the value of said second electrical quantity in the sense to make said differential relay means stop said motor, and means for causing said air-borne device to go to a lower or higher altitude in response to operation of said motor in the direction corresponding to an altitude measurement that is too large or too small, respectively.

2. A control system installed in a dirigible air-borne device for guiding it downwardly toward a target, said system comprising distance measuring means for producing an electrical quantity that is a predetermined function of the distance to said target, a frequency-modulated radio altimeter for producing a second electrical quantity that is a predetermined function of the altitude of said device, said altimeter including a frequency counter, means for biasing said counter to adjust the value of its output, a reversible motor, differential relay means for causing said motor to run in one direction or the other depending upon which one of said electrical quantities is the greater, means responsive to the rotation of said motor for changing said counter bias and thereby changing the value of said second electrical quantity in the sense to make said differential relay means stop said motor, and means for causing said aid-borne device to go to a lower or higher altitude in response to operation of said motor in the direction corresponding to an altitude measure that is too large or too small respectively.

3. A control system installed in a dirigible air-borne device for guiding it downwardly toward a target, said system comprising a frequency-modulated radio distance measuring system which includes a frequency counter for producing a counter output that is a predetermined function of the distance to said target, a frequency-modulated radio altimeter which includes a frequency counter for producing a second counter output that is a predetermined function of the altitude of said air-borne device, means for biasing said counter to adjust the value of its output, a reversible motor, means for supplying said counter outputs in differential relation to a control circuit for causing said motor to run in one direction or the other depending upon which one of said counter outputs is the greater, means responsive to the rotation of said motor for changing said counter bias and thereby changing the value of said altimeter counter output in the sense to stop said motor, and means for causing said air-borne device to go to a lower or higher altitude in response to operation of said motor in the direction corresponding to an altitude measurement that is too large or too small, respectively.

References Cited in the file of this patent

UNITED STATES PATENTS

| | | |
|---|---|---|
| 2,109,475 | Fanning | Mar. 1, 1938 |
| 2,176,469 | Moueix | Oct. 17, 1939 |
| 2,225,046 | Hunter | Dec. 17, 1940 |
| 2,248,215 | Budenbom | July 8, 1941 |
| 2,322,225 | Crane et al. | June 22, 1943 |
| 2,393,624 | Ferrill | Jan. 29, 1946 |
| 2,412,003 | Neufeld | Dec. 3, 1946 |
| 2,424,193 | Rost et al. | July 15, 1947 |
| 2,430,292 | Hershberger | Nov. 4, 1947 |